United States Patent [19]

Parker

[11] Patent Number: 5,473,940
[45] Date of Patent: Dec. 12, 1995

[54] CALIPER FOR USE WITH WHEEL BALANCERS

[75] Inventor: Paul D. Parker, Kirkwood, Mo.

[73] Assignee: Hunter Engineering Company, Bridgeton, Mo.

[21] Appl. No.: 182,751

[22] Filed: Jan. 14, 1994

[51] Int. Cl.⁶ .................................................. G01B 5/08
[52] U.S. Cl. ........................................ 73/487; 33/558.01
[58] Field of Search ........................... 73/462, 468, 487; 33/203, 203.14, 558.01, 558.02, 558.03, 558.04, 783, 792, 794, 797, 798, 801, 807, 501.08, 555.1

[56] References Cited

U.S. PATENT DOCUMENTS

| | | | |
|---|---|---|---|
| 302,685 | 7/1884 | Dodson | 33/558.01 |
| 345,978 | 7/1886 | Lombard | 33/558.01 |
| 672,424 | 4/1901 | Starrett | 33/558.01 |
| 777,643 | 12/1904 | Sanger | 33/558.01 |
| 832,203 | 10/1906 | Kohler et al. | 33/558.01 |
| 1,281,526 | 10/1918 | Curtis | 33/558.01 |
| 5,154,003 | 10/1992 | Moore | 33/558.01 |
| 5,156,049 | 10/1992 | Douglas | 73/462 |

OTHER PUBLICATIONS

Operation Instructions DSP 9000 Wheel balancer Models 9001/9002/9003, Hunter Engineering Company–Copyright 1992.

Primary Examiner—Hezron E. Williams
Assistant Examiner—Richard A. Moller
Attorney, Agent, or Firm—Polster, Lieder, Woodruff & Lucchesi

[57] ABSTRACT

A caliper is provided to be used with an electronic wheel balancer to measure both the diameter and width of a wheel assembly. The caliper includes a pair of pivotally connected arms which are movable between a spread apart position in which the caliper can measure wheel assembly diameter and a crossed position in which the caliper can be used to measure wheel assembly width. Each arm includes a base portion and a measuring arm extending from the base portion. A measuring arm base is defined between the measuring arm and the caliper arm base. A first set of measuring marks are formed in the caliper arm base for use in measuring the wheel diameter. A second set of measuring marks are formed in the measuring arm base for use in determining wheel width. The second marks are calibrated to account for the width of the metal forming the wheel rim. The caliper arm base includes a pointer, positioned opposite the measuring arm. The pointer points to the second set of marks to indicate the measured wheel width. An edge of the caliper arm base is used to read the first set of measuring marks to determine wheel diameter. The measuring arm has a head which has two pointers. One of the pointers is used to determine wheel assembly width, the other is used to determine diameter.

22 Claims, 4 Drawing Sheets

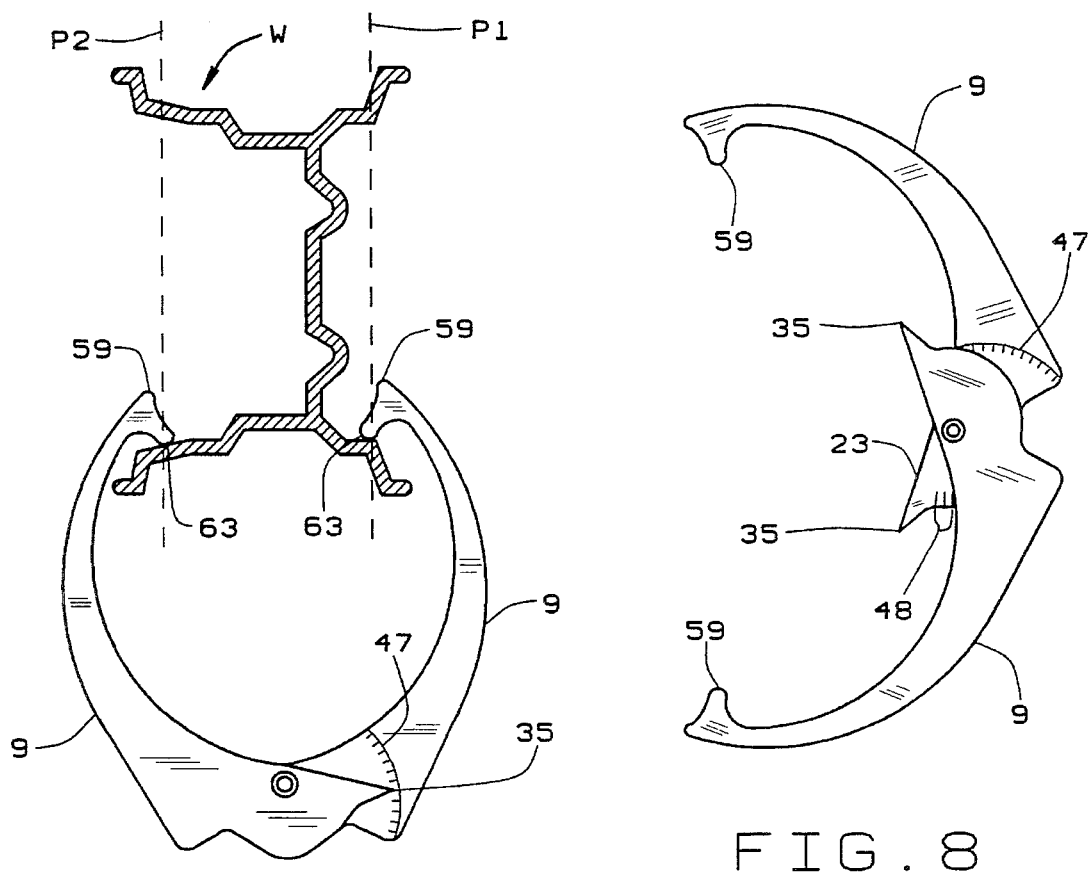
FIG. 6
FIG. 8
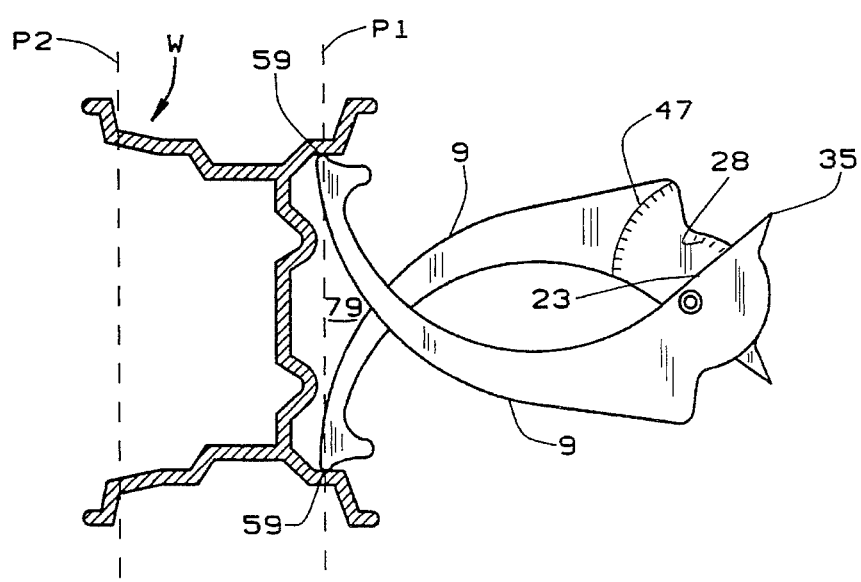
FIG. 7

CALIPER FOR USE WITH WHEEL BALANCERS

BACKGROUND OF THE INVENTION

This invention relates to wheel balancing equipment, and, in particular, to a caliper for use with wheel balancers.

Electronic wheel assembly balancers are known. Such balancers are used to determine the magnitude and radial location for weights to correct for imbalance which may exist in a wheel assembly. To determine the appropriate corrective weight to be applied, the diameter of the plane in which the corrective weight is to be placed must be supplied to the balancer. If the wheel assembly is to be dynamically balanced, the balancer must also be supplied with the distance between the planes in which corrective weights are to be placed. If the electronic balancer has an electronic data entry means, these dimensions can be automatically supplied to the balancer. However, if the balancer does not have such data entry means, the dimensions must be manually measured and entered. The dimensions can be entered using knobs, such as disclosed in co-assigned Pat. No. 5,156,049, which is incorporated herein by reference.

To manually enter the dimensions, the dimensions must of course first be determined. The diameter of the weight plane is presently often determined using a tape measure or the like. Although a balancer operator may be able to properly read the tape measure, he may inadvertently take the measurement slightly off of the diameter. He will thus supply a measurement smaller than the actual diameter of the wheel assembly. The balancer will determine the corrective weight at this wrong diameter and an incorrect weight, therefore, will be applied to the wheel. In a dynamic balancing operation, the operator must also supply the balancer with the wheel width. The wheel width at the rim is usually relied upon as the distance between the weight planes. However, if the weights are not being placed on the rim where the operator knows the distance between the planes, the distance between the planes (i.e., the wheel width) must be manually measured. This distance, like the wheel diameter, can inadvertantly be measured incorrectly. A wrong dimension will be supplied to the balancer and an incorrect weight will be applied to the wheel.

SUMMARY OF THE INVENTION

Among the various objects and features of the present invention is the provision of an electronic wheel balancer which facilitates manual measurement of the wheel diameter and width.

A second object is to provide such a balancer which includes a caliper.

A third object is to provide such a balancer wherein the caliper can measure both wheel diameter and wheel width.

These and other objects will become apparent to those skilled in the art in light of the following disclosure and accompanying drawings.

Briefly stated, a caliper is provided to be used with an electronic wheel balancer. The caliper can measure both the diameter and width of the wheel assembly so that the proper dimensions may be supplied to the balancer. The caliper includes a pair of pivotally connected arms. The arms are movable between a spread apart position in which the caliper can measure wheel assembly diameter and a crossed position in which the caliper can be used to measure wheel assembly width. Each arm includes a surface having a downwardly depending wall. A base portion is formed at one end of each arm and is defined by a flat edge and a generally arcuate edge. A semicircular rib concentric with the bore and a raised platform which surrounds and is concentric with the bore is formed in the base. The rib and platform are substantially the same height. When the arms of the caliper are connected, the ribs and platforms of the arms are in contact with each other and serve to separate the arms.

A measuring arm base extends from one side of the base portion and a curved measuring arm extends from the measuring arm base. A head is formed at a free end of the measuring arm and includes two pointers. One of the pointers is used to determine wheel assembly width, the other is used to determine diameter.

Another pointer extends from the base on a side opposite of the measuring arm. A first set of measuring marks are formed on the measuring arm base. The pointer of one arm points to the first measuring marks to indicate a diameter of the wheel assembly. A second set of measuring marks are formed on the caliper arm base inside of the rib in an arcuate pattern. The base portion flat edge of one arm is colinear with the second set of marks to indicate a width of the wheel assembly. Preferably, the second set of marks are calibrated to account for the width of the metal which makes up the wheel rim.

A ramp is formed on the measuring arms. The ramp is formed to bring the heads of the two arms into the same plane when the caliper arms are connected. Preferably the ramp is sloped to facilitate movement of the arms from the second crossed position to the first spread apart position.

BRIEF DESCRIPTION OF THE DRAWINGS

FIG. 6 is a schematic of the caliper being used to measure wheel width;

FIG. 7 is a schematic of the caliper being used to measure wheel diameter; and

FIG. 8 is a schematic of the caliper being used to measure a wide wheel width.

Similar reference numerals indicate similar parts throughout the several views of the drawings.

DESCRIPTION OF THE PREFERRED EMBODIMENT

Figure 1:
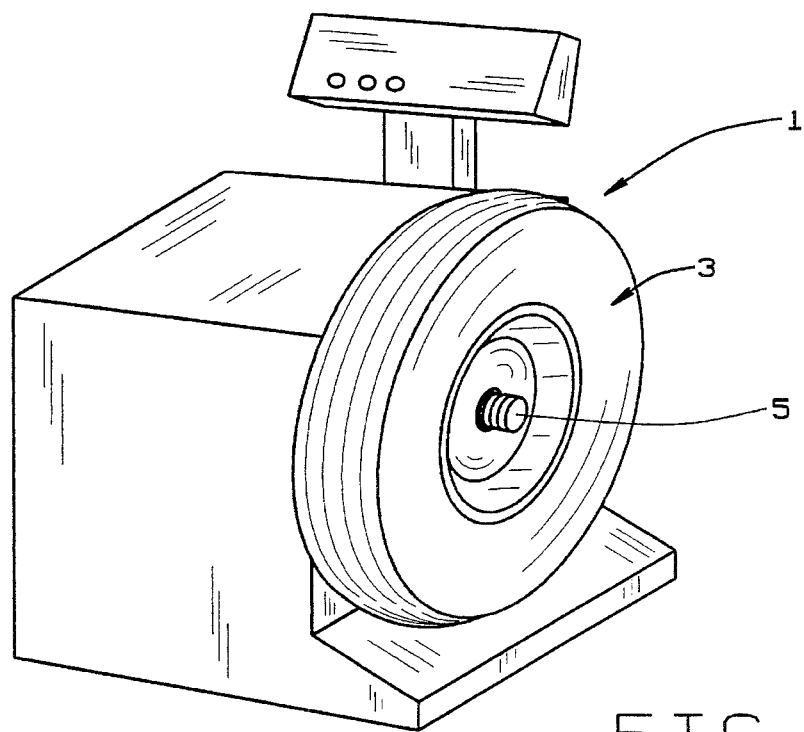
FIG. 1 is a perspective view of a wheel balancer with a wheel assembly mounted thereon.

Referring now to the FIG. 1, a wheel balancer 1 is shown with a wheel assembly 3 mounted thereon. As is common, wheel assembly 3 is mounted on a shaft 5 of the balancer. Shaft 5 generally extends beyond the hub or center of the wheel, as is shown in FIG. 1. Wheel balancer 1 may be wholly conventional. It is preferably an electronic wheel balancer which includes a mechanism to manually input wheel diameter and width. The input may be an input system such as is described in co-assigned Pat. No. 5,156,049, which is incorporated herein by reference.

Turning to FIGS. 2–5, a caliper 7 of the present invention is shown in more detail. Caliper 7 includes two arms 9. The arms 9 are preferably identical, and thus only one of the arms will be described. Arms 9 have a top surface 11 from which a continuous peripheral wall 13 extends. Wall 13 is generally perpendicular to surface 11. A bore 17 is formed in a base 15 of arm 9. Bore 17 is defined by a boss 19 depending from a bottom side of surface 11. Boss 19 is preferably as deep as wall 13. A raised, generally circular platform 21 is formed on a top side of surface 11. Platform 21 surrounds and is concentric with bore 17. The two arms 9 are pivotally connected together by a pin 22 which passes through the bosses 19 of each arm. Pin 22 is held in place by an E-ring 24. The caliper 7 is assembled so that the tops of arms' surfaces 11 are facing each other and the platforms 21 are in contact with each other. Platforms 21 thus serve to space apart arms 9 so that they may more freely pivot with respect to each other.

Figure 3:
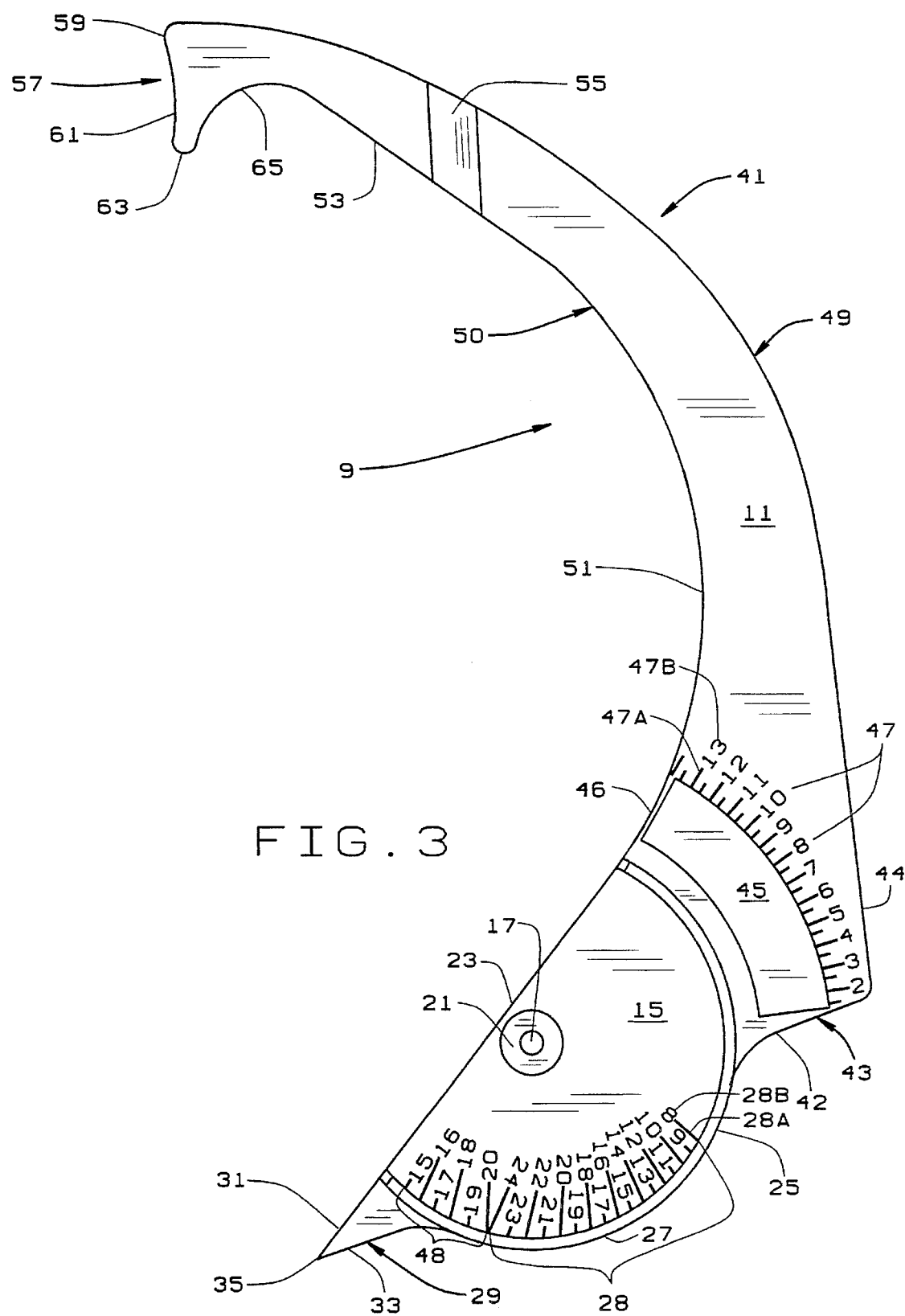
FIG. 3 is a top plan view of one arm of the caliper.

Turning to FIG. 3, base 15 is bounded by a flat edge 23 and an arcuate edge 25. A semicircular rib 27 is formed on base 15 at edge 25. Rib 27 is preferably as tall as platform 21. When arms 9 are pivotally connected, the ribs of the arms contact and define a gliding surface over which the arms can pivot relative to one another. The rib 27 and platform 21 in combination separate the bases 15 of the two arms. This reduces the contact between the two arms, thereby reducing the friction between the arm. Pivoting of the arms relative to one another is therefore easier.

A plurality of marks 28 are formed inside of rib 27. Marks 28 include a line 28A extending inwardly from the rib and a number 28B indicative of a distance at the end of the line 28A. Marks 28 are preferably molded into base 15 and are raised. Marks 28 could alternatively be sunken. Marks 28 can be formed in other manners as well. For example, they can be printed on a decal which is applied to the arm or they could be printed directly on the arm. Bore 17 is formed to be at the center of the circle defined by rib 27. When the arms 9 are connected, the flat edge 23 is used to read the distance measured by caliper 7 using marks 28. Lines 28A are therefor formed so that they will be parallel to edge 23 as it is pivoted.

A pointer 29 is formed at one end of base 15. Pointer 29 has a bottom edge 31 colinear with base edge 23. A top edge 33 extends toward rib 27 at an acute angle with respect to edge 31. Edges 31 and 33 intersect to define a point 35.

A measuring arm 41 extends from base 15 opposite pointer 29. Measuring arm 41 has an arm base 43 which is defined by edges 42, 44, and 46. Edge 42 extends radially from base edge 25. Edge 44 is generally perpendicular to edge 42 and extends from an end of edge 42. Edge 46 is a continuation of base edge 23.

A generally arcuate depression 45 is formed in arm base 43. A second set of marks 47 are formed along an edge of depression 45 opposite rib 27. Like marks 28, marks 47 include a line 47A extending from the edge of depression 45 and a number 47B indicative of a distance at the end of the line. Depression 45 provides an area where further marks may be placed. Where marks 27 may be in inches, the marks placed in depression 45 may be metric. The metric marks may be applied by decals, for example. Lines 47A preferably extend perpendicularly to depression 45. Marks 47 are positioned so that pointer 29 will point to the mark indicative of a distance measured by caliper 7. The arc of the depression and the marks 47 is therefor concentric with the arc swept by the pointer 29 as the arms are pivoted relative to each other. A third set of marks 48 are provided adjacent marks 28 and allow for greater widths to be measured.

Figure 4:
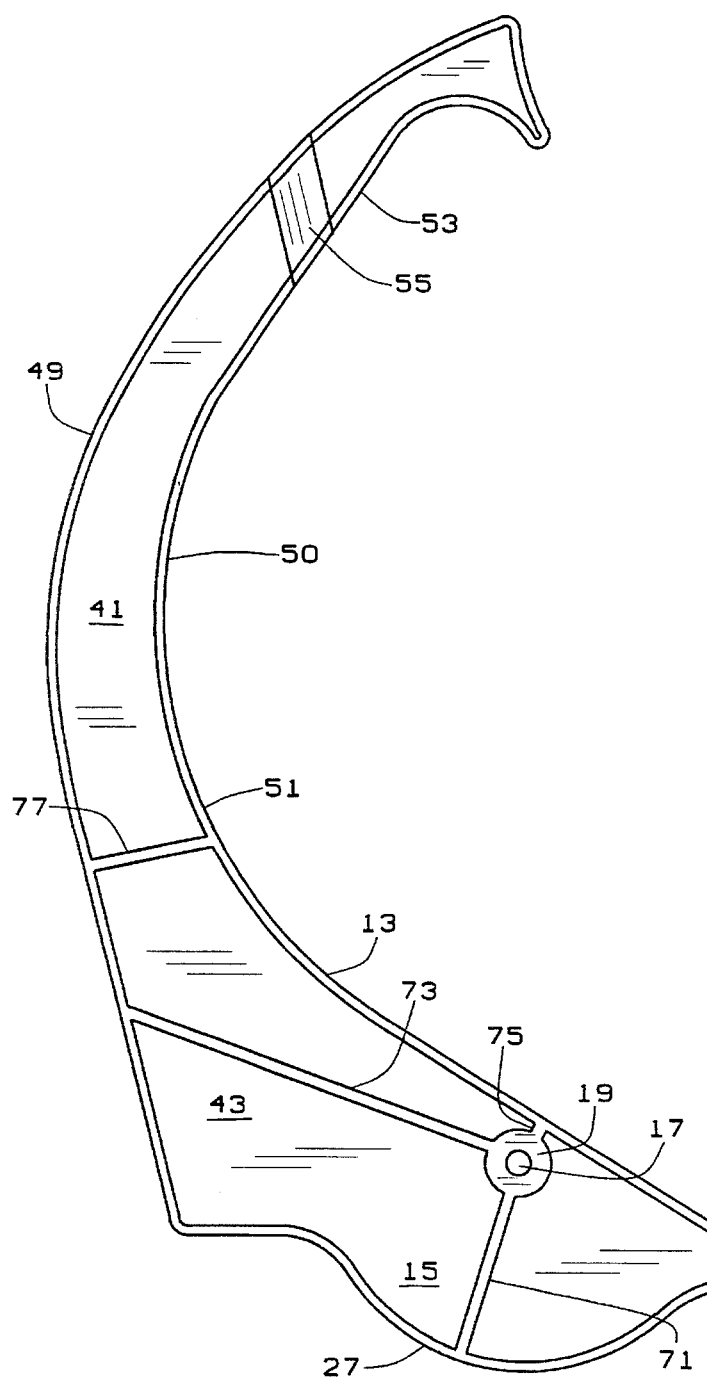
FIG. 4 is a bottom plan view of the caliper arm.
Figure 5:
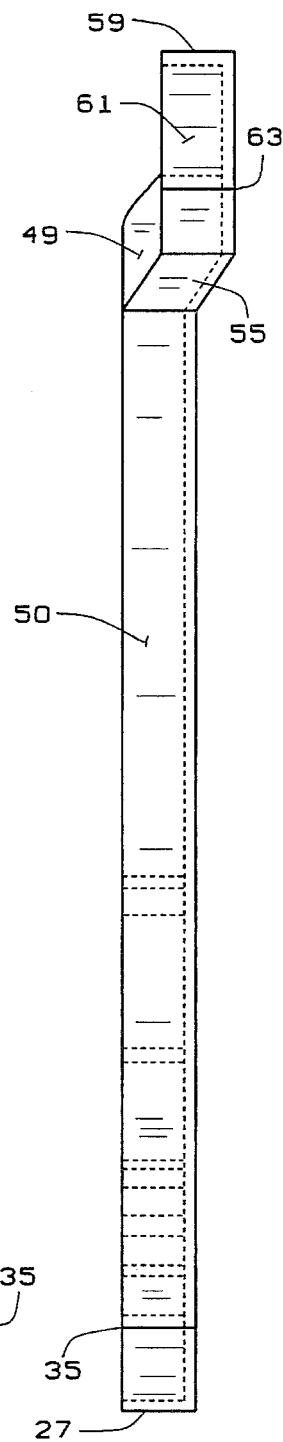
FIG. 5 is a side elevational view of the caliper arm.

Arm 41 has an outer edge 49 and an inner edge 50. Outer edge 49 is generally curved. Inner edge 50 has a generally curved section 51 extending from arm base 43 and a generally straight section 53 extending from curved section 51. A ramp 55 is formed approximately midway along the length of straight section 53. Ramp 55 is sloped and has a height approximately equal to the depth of wall 13. Ramp 55 therefore places the ends of arms 41 in the same plane when the arms 9 are connected. As best seen in FIGS. 3 and 4, ramp 55 does not extend straight across arm 41, rather, it forms an oblique angle with a longitudinal axis of the arm.

Arm 41 ends in a head 57. Head 57 has a first pointer 59 which is formed at the far end of arm 41. An end edge 61 extends from pointer 59 towards base pointer 29 to a second pointer 63. Edge 61 is preferably arcuate and slightly concave. An inner concave edge 65 curves from pointer 63 to arm edge 53.

Figure 2:
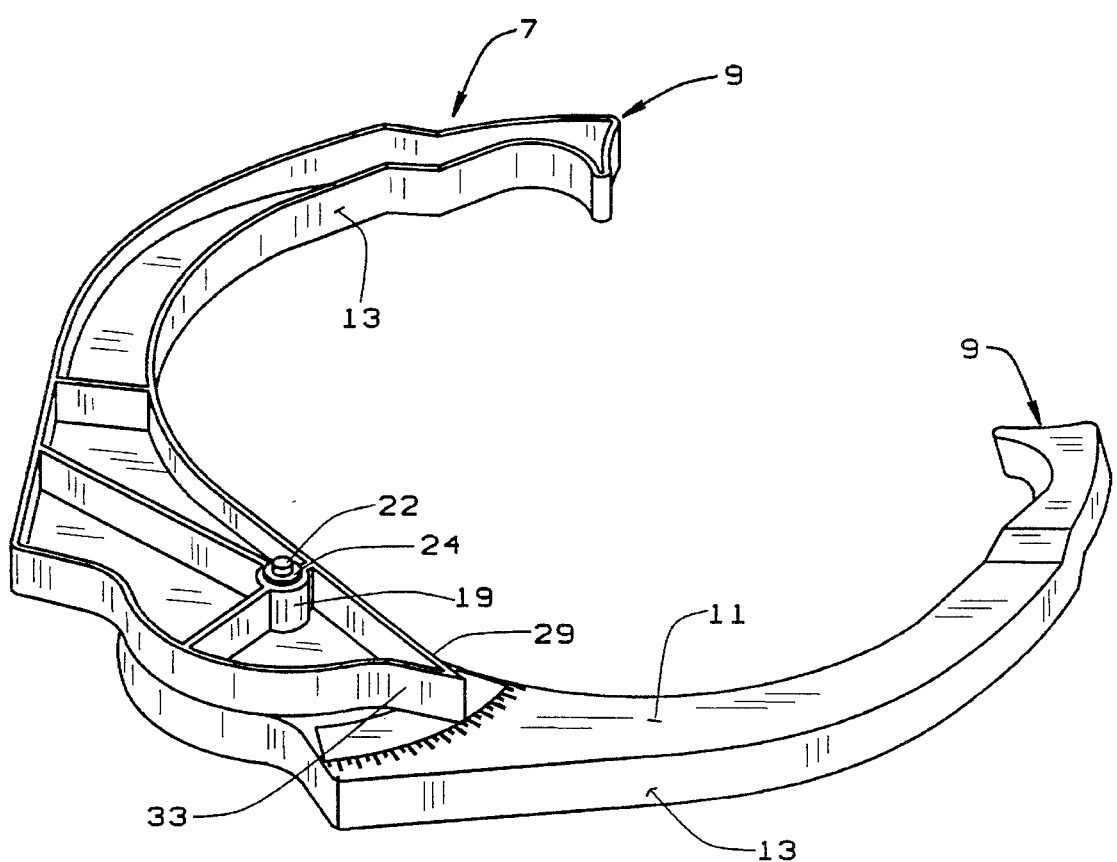
FIG. 2 is a perspective view of a caliper of the present invention used to measure both wheel diameter and wheel width.

The arms 9 are preferably hollow (i.e. generally U-shaped in cross-section) as shown in FIGS. 2 and 4. To add structural strength to base 15 and arm base 43, a plurality of ribs are molded into the bottom of the arm. Three ribs 71, 73, and 75 extend from boss 19 to walls 13. Ribs 71 and 73 are preferably perpendicular to each other. Rib 75 is substantially coplanar with rib 71. A fourth rib 77 extends between the inner and outer edges of measuring arm 41 at approximately the point where arm base 43 and measuring arm 41 merge.

The operation of caliper 7 is shown in FIGS. 6–8. In FIG. 6, caliper 7 is being used to measure the width of a wheel W between two planes P1 and P2. Arms 9 are spread apart and head pointers 63 are placed on the wheel where the planes P1 and P2 intersect the wheel. Base pointer 35 indicates on marks 47 the width between planes P1 and P2 of the wheel. The markings are shown in inches, but other units could be used. The markings 47 preferably do not correspond to the actual distance between pointers 63. The markings are calibrated to take into account the width of the metal used to make the rim. For example, if the metal of the rim has a width of 0.15", the markings are calibrated to take into account this width so that the width of the wheel at the tire bead is determined. The width of the wheel at the tire bead can then be supplied to the balancer.

In FIG. 7, the caliper is being used to measure the diameter of the wheel in plane P1. The arms 9 are crossed and the head pointer 59 is placed against the rim at the desired diameter. Arms 9 are preferably slightly flexible. They can thus be flexed sufficiently so that the arms can be pivoted across each other, as shown in FIG. 7. Using the flat edge 23, the markings 28 are read to determine the wheel diameter. The markings are formed such their lines are parallel to the edge 23.

In FIG. 8, the caliper is being used to measure widths greater than provided for by the marks 47. To measure such distance, the marks 48 are used, by reading the distance indicated with the edge 23 of base 15, in the same manner as was done to measure the diameter of the wheel.

The arms are sized so that the caliper 7 may be applied to the wheel when the wheel is on the balancer. When the arms are crossed, they define a V-shaped area 79 which is sufficiently deep so that the balancer shaft 5 does not interfere with the operation of the caliper. The slope of the ramp 55 facilitates spreading of the arms 9 so that they may be used to measure wheel width. The arms are made of a material which will keep the arms in generally one plane (i.e. keep the arms substantially flat) but which is slightly flexible so that the arms may be flexed to cross over each other to measure the diameter of the wheel.

In view of the above it will be seen that the objects and features of the present invention are achieved and other advantageous results obtained. It is not intended that the present invention be limited by the specification and drawings, which are merely illustrative, but only by the appended claims.

I claim:

1. In combination, an electronic wheel balancer for electronically determining the magnitude and angular position for weights used to correct for unbalance in a wheel assembly and a caliper for determining both the width of the wheel and the diameter of the wheel, the caliper including a pair of arms pivotally connected, said arms being movable with respect to each other between a spread apart position in which the caliper can measure wheel assembly diameter and a crossed position in which the caliper can be used to measure wheel assembly width; each said arm including:

a base portion, said base portion having a flat edge and a generally arcuate edge, said arcuate edge defining a semicircle;

an arm base on a first side of said base portion;

a curved measuring arm extending from said base, said arm having a head at a free end thereof, said head having at a pointer thereon; said measuring arm also including a ramp to facilitate movement of said arms between said crossed position and said spread apart position;

a pointer extending from a second side of said base;

a first set of measuring marks arranged inside of said semicircle, the base portion flat edge of one arm being colinear with individual ones of said first set of measuring marks to indicate a diameter of said wheel assembly; and a second set of measuring marks being formed on said arm base, said second set of measuring marks being arranged in an arcuate pattern, said pointer of one arm [being] pointing to individual ones of said second set of marks as said arms are pivoted with respect to each other, said second set of measuring marks indicating a width of said wheel assembly.

2. The combination of claim 1 wherein said arm head has two pointers, a first of said two pointers being at an end of said arm and being used to determine wheel diameter and a second of said two pointers being offset from said first pointer and being used to measure wheel width.

3. The combination of claim 1 wherein said first set of measuring marks are calibrated to correct for the width of the wheel rim.

4. The combination of claim 1 wherein said caliper includes a top surface and a peripheral wall depending downwardly from said top surface; said ramp having a height substantially equal to the height of said peripheral wall.

5. The combination of claim 1 wherein each said arm includes a boss defining a bore, said bore being positioned at a center of a circle defined by said semicircle, said bore receiving a pin which connects said arms together.

6. The combination of claim 5 wherein a raised platform surrounds and is concentric with said bore.

7. The combination of claim 6 wherein said base includes a rib which surrounds and defines said semicircle.

8. The combination of claim 7 wherein said rib is substantially equal in height to said platform, the arms of said caliper being pivotally connected such that the ribs and platforms of the arms are in contact with each other, said platforms and ribs serving to separate said arms.

9. The combination of claim 1 wherein said measuring arms have an outer edge and an inner edge, said outer edge being generally curved, said inner edge defining a curved section extending from said measuring arm base and a generally straight section extending from said curved section to said head.

10. The combination of claim 9 wherein said head of said pointer extends generally toward said base.

11. The combination of claim 10 wherein said head has an outer edge and an inner edge, said outer and inner edges being generally concave.

12. The combination of claim 1 wherein said arms include a plurality of ribs.

13. A caliper for use with a wheel balancer, the caliper being used to measure both the width and diameter of a wheel assembly; the caliper including a pair of arms pivotally connected, said arms being movable between a spread apart position in which the caliper can measure wheel assembly diameter and a crossed position in which the caliper can be used to measure wheel assembly width; each said arm including:

a base portion, said base being defined by a flat edge and a generally arcuate edge and including a semicircular rib: a bore centrally located with respect to a circle defined by said rib: and a raised platform which surrounds and is concentric with said bore; said rib and said platform having substantially the same height, the arms of said caliper being connected such that the ribs and platforms of the arms are in contact with each other, said platforms and ribs serving to separate said arms;

an arm base on a first side of said base portion;

a curved measuring and extending from said arm base, said arm having a head at a free end thereof, said head having a pointer thereon;

a pointer extending from a second side of said base on a side opposite said first side of said base;

a first set of measuring marks arranged inside of said rib, said base portion flat edge of one arm being colinear with individual ones of said first set of marks as said arms are pivoted with respect to each other, said marks indicating a width of said wheel assembly;

a second set of measuring marks being formed on said arm base, the pointer of one arm pointing to an individual one of said first set of measuring marks to indicate a diameter of said wheel; and a third set of measuring marks for measuring the diameter of said wheel assembly, said third set of measuring marks being on said caliper base adjacent said first set of measuring marks.

14. The caliper of claim 13 wherein said pointer includes two pointing ends, a first of said pointing ends being at an end of said arm and being used to determine wheel diameter and a second of said pointing ends being offset from said first pointing end and being used to measure wheel width.

15. The caliper of claim 13 wherein said first set of measuring marks are calibrated to correct for the width of the wheel rim.

16. The caliper of claim 13 wherein said measuring arm includes a ramp to facilitate movement of said arms from said second crossed position to said first spread apart position.

17. The caliper of claim 16, said caliper having a top surface and a wall depending downwardly from said top surface; said ramp having a height substantially equal to the height of said wall.

18. The caliper of claim 13 wherein said measuring arms have an outer edge and an inner edge, said outer edge being generally curved, said inner edge defining a curved section extending from said measuring arm base and a generally straight section extending from said curved section to said head.

19. The caliper of claim 18 wherein said head of said pointer extends generally toward said base.

20. The caliper of claim 21 wherein said head has an outer edge and an inner edge, said outer and inner edges being generally concave.

21. The caliper of claim 13 wherein said arms include a plurality of ribs.

22. A caliper for use with a wheel balancer, the caliper being used to measure both the width and diameter of a wheel assembly having a rim; the caliper including a pair of arms pivotally connected, said arms being movable between a spread apart position in which the caliper can measure wheel assembly diameter and a crossed position in which the caliper can be used to measure wheel assembly width; each said arm including:

a first set of measuring marks indicating a width of said wheel assembly, said first set of measuring marks being calibrated to provide a width of said wheel assembly at the inside of the rim;

a second set of measuring marks to indicate a diameter of said wheel: and a third set of measuring marks positioned adjacent said first set of measuring marks for measuring the width of said wheel assembly for wheel assemblies wider than the greatest width measurable with said second set of marks.

* * * * *

UNITED STATES PATENT AND TRADEMARK OFFICE
CERTIFICATE OF CORRECTION

PATENT NO. : 5,473,940

DATED : December 12, 1995

INVENTOR(S) : Paul D. Parker

It is certified that error appears in the above-indentified patent and that said Letters Patent is hereby corrected as shown below:

In the Abstract:

At line 5, replace "diameter" with ---width---; and

At line 7, replace "width" with ---diameter---.

In the Claims:

In column 5, line 15, replace "diameter" with ---width---.

In column 5, line 17, replace "width" with ---diameter---.

In column 5, line 37, delete "[being]".

In column 5, line 46, replace "first" with ---second---.

In column 6, line 19, replace "diameter" with ---width---.

In column 6, line 20, replace "width" with ---diameter---.

In column 6, line 42, replace "width" with ---diameter---.

In column 6, line 46, replace "diameter" with ---width---.

In column 6, line 56, replace "first" with ---second---.

In column 8, line 1, replace "diameter" with ---width---.

In column 8, line 2, replace "width" with ---diameter---.

UNITED STATES PATENT AND TRADEMARK OFFICE
CERTIFICATE OF CORRECTION

PATENT NO. : 5,473,940
DATED : December 12, 1995
INVENTOR(S) : Paul D. Parker

It is certified that error appears in the above-indentified patent and that said Letters Patent is hereby corrected as shown below:

Column 8, line 13, replace "second" with —first—

Signed and Sealed this

Eighteenth Day of June, 1996

Attest:

BRUCE LEHMAN

Attesting Officer     Commissioner of Patents and Trademarks